United States Patent
Han et al.

(10) Patent No.: US 8,415,436 B2
(45) Date of Patent: Apr. 9, 2013

(54) POLYMER PARTICLES HAVING POLYMER BRUSH AND METHOD OF PREPARING THE SAME

(75) Inventors: Bo-ryeong Han, Daejeon (KR);
Moon-seok Chun, Daejeon (KR);
Do-yeon Park, Daejeon (KR); Su-kyung Kim, Gyeongsangnam-do (KR);
Chong-min Koo, Daejeon (KR);
Bum-jae Lee, Daejeon (KR); Choel-han Gang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/516,006

(22) PCT Filed: Nov. 19, 2007

(86) PCT No.: PCT/KR2007/005802
§ 371 (c)(1),
(2), (4) Date: Sep. 18, 2009

(87) PCT Pub. No.: WO2008/062975
PCT Pub. Date: May 29, 2008

(65) Prior Publication Data
US 2010/0010160 A1    Jan. 14, 2010

(30) Foreign Application Priority Data

Nov. 23, 2006 (KR) .................. 10-2006-0116577
Oct. 18, 2007 (KR) .................. 10-2007-0104820

(51) Int. Cl.
*C08L 51/00* (2006.01)
*C08L 51/06* (2006.01)

(52) U.S. Cl.
USPC ........... 525/313; 525/242; 525/902; 428/403; 428/407

(58) Field of Classification Search .................. 152/450;
428/403, 407; 525/242, 313, 314, 332.2, 525/332.9, 902
See application file for complete search history.

(56) References Cited

U.S. PATENT DOCUMENTS

| 6,437,050 | B1 * | 8/2002 | Krom et al. ............ 525/313 |
| 2005/0154117 | A1 * | 7/2005 | Wang et al. ............ 524/493 |
| 2006/0084722 | A1 * | 4/2006 | Bohm et al. ............ 523/200 |

FOREIGN PATENT DOCUMENTS

| JP | 09-241310 A | 9/1997 |
| JP | 2002514667 A | 5/2002 |
| JP | 2005205338 A | 8/2005 |
| JP | 2005537341 A | 12/2005 |
| JP | 2009544824 A | 12/2009 |
| KR | 20040011905 A | 2/2004 |
| KR | 20050045290 A | 5/2005 |
| WO | 8603209 A | 6/1986 |
| WO | 9958588 A1 | 11/1999 |
| WO | 03085040 A2 | 10/2003 |
| WO | 2008014464 A2 | 1/2008 |

OTHER PUBLICATIONS

International Search Report, PCT/KR2007/005802.
Kim et al., Colloid Polym Sci, 279; 146-152 (2001).
Awan et al., Journal of Polymer Science, Part A, Polymer Chemistry, 34; 2633-2649 (1996).

* cited by examiner

*Primary Examiner* — Irina S Zemel
*Assistant Examiner* — Jeffrey Lenihan
(74) *Attorney, Agent, or Firm* — Lerner, David, Littenberg, Krumholz & Mentlik, LLP

(57) ABSTRACT

The present invention provides a polymer particle and a method of preparing the same. More precisely, the invention provides a polymer particle having optimum impact strength and improved elastic recovery rate by forming the brush having softness on the surface of the monodisperse polymer particle by the anion dispersion polymerization using a conjugated diene monomer.

10 Claims, 1 Drawing Sheet

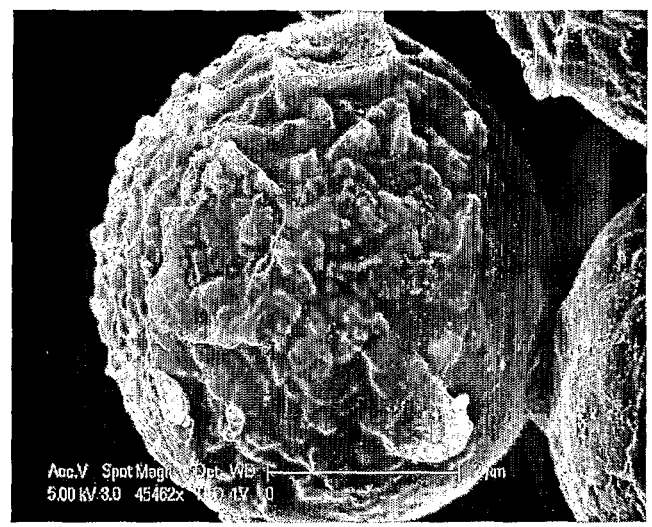

POLYMER PARTICLES HAVING POLYMER BRUSH AND METHOD OF PREPARING THE SAME

CROSS REFERENCE TO RELATED APPLICATIONS

The present application is a national phase entry under 35 U.S.C. §371 of International Application No. PCT/KR2007/005802, filed Nov. 19, 2007, published in English, which claims priority from Korean Patent Application No. 10-2006-0116577, filed Nov. 23, 2006 and Korean Patent Application No. 10-2007-0104820, filed Oct. 18, 2007, all of which are incorporated herein by reference.

TECHNICAL FIELD

The present invention relates to a polymer particle and a method of preparing the same, more precisely a polymer particle with improved elastic recovery rate and optimum impact strength resulted from the grafting of brush having softness on the surface of a monodisperse polymer particle and a method of preparing the same.

BACKGROUND ART

To prepare a polymer of at least 1 μm in mean diameter, a modified radical process such as suspension polymerization, dispersion polymerization, emulsion polymerization or precipitation polymerization is generally used. In suspension polymerization, a monomer and water are stirred at high speed to form droplets, so the resultant polymer has a wide range of mean diameter. Therefore, polymerization has to be performed several times, stage by stage, in order to obtain a target sized polymer. Dispersion polymerization is a method to produce a polymer by using a stabilizer and a solvent in which the monomer is soluble but the produced polymer is insoluble, so the polymerization result can be very vulnerable with the characteristics of a solvent, a stabilizer and their contents. According to emulsion polymerization, the mean diameter of the produced polymer is less than 1 μm. To produce a polymer of at least 1 μm in mean diameter, the swelling method using a seed has to be hired but then reaction process becomes very complicated and reaction time is extended [Colloid Polymer Science Vol. 279, 146-152 (2001)].

In addition to the above radical processes, anion dispersion polymerization can be used to produce a polymer, for example polystyrene [Journal of Polymer Science; Part A; Polymer Chemistry Vol. 34, 2633-2649 (1996)]. This method facilitates a simple and fast reaction and thus favors the production of a monodisperse polymer. However, the monodisperse polymer produced by the anion disperse polymerization does not have such good properties including impact resistance and elastic recovery rate.

With the increasing demand of ultrafine gapping and high connection density in circuit of electronic packaging such as LCD, PDP, OLED, etc, it is required to connect numbers of electrodes at a time. In particular, conductive adhesive for mechanical and electric connection of FPC (Flexible Printed Circuit) to glass display has been used in LCD packaging.

The conductive adhesive is largely divided into isotropic conductive adhesive and anisotropic conductive film (ACF), and basically they all have the same structure in which monodisperse conductive particles (conductive balls) are dispersed in a thermosetting or thermoplastic insulating resin.

The conductive ball is composed of an insulating, cross-linked monodisperse polymer core particle of 1-10 μm in diameter having preferable elastic modulus and recovery rate and the surface of the polymer particle is coated with a metal such as Ni or Au to increase conductivity. The monodisperse polymer particle can be formed by polystyrene resin, polyacrylate resin and urethane resin, etc.

The monodisperse polystyrene resin prepared by anion dispersion polymerization can be used for the conductive ball, but in that case the improvement of physical properties including impact resistance and elastic recovery rate is required.

DISCLOSURE OF THE INVENTION

It is an object of the present invention, to solve the above problems, to provide a method for increasing physical properties of a monodisperse polymer particle such as impact resistance and elastic recovery rate by strengthening softness.

Precisely, it is an object of the present invention to provide a polymer particle with improved elastic recovery rate and optimum impact strength by grafting a brush having softness onto the surface of the monodisperse polymer particle and a method of preparing the same.

Particularly, it is an object of the invention to provide a polymer particle that is appropriate for the use as a polymer core particle of a conductive ball of the conductive adhesive.

The above object and other objects of the present invention can be achieved by the following embodiments of the present invention.

The polymer particle of the invention contains a brush formed by the graft-polymerization of a conjugated diene based monomer onto the surface of a monodisperse polymer particle. Herein, the monodisperse polymer is formed by the anion dispersion polymerization and has mean diameter of 1-15 μm and size distribution less than 1.5, and is composed of 50-100 weight % of a styrene based monomer and 0-50 weight % of a comonomer. The preferable weight average molecular weight of the brush of the polymer particle of the invention is 5,000-100,000. The preferable graft efficiency of the brush is at least 40% and more preferably 60%. The preferable graft density of the brush is $0.5 \times 10^6$-$6.5 \times 10^6$ chains/μm².

The present invention also provides a method of preparing a polymer particle. The method of preparing a polymer particle of the invention comprises the following steps: (a) loading a reaction solvent, monodisperse polymer particles and a chelating ligand in a reactor and regulating a reaction temperature to 50-80° C.; (b) inducing a reaction by adding an anion polymerization initiator; (c) grafting a brush by the anion polymerization after adding a conjugated diene based monomer; and (d) terminating the reaction by adding a polymerization terminator.

The method of the present invention additionally includes the step of eliminating the anion polymerization initiator remaining in the reactor between step (b) and step (c).

The present invention is described in detail hereinafter.

In the present invention, "brush" indicates a short polymer chain enveloping the surface of the polymer particle in which one of the two ends is attached on the surface of the polymer particle. The brush can be prepared by surface initiation polymerization and is characterized by planting the functions wanted on the newly formed surface.

In the course of study on a method of preparing a monodisperse polymer particle via anion dispersion polymerization, the present inventors established a method of preparing a polymer particle by anion polymerization of a conjugated diene based monomer after generating anions in the double bond on the surface of the monodisperse polymer particle by reacting the monodisperse polymer particle with an anion polymerization initiator and further completed this invention by confirming that the polymer particle prepared by the above method had optimum impact strength and improved elastic recovery rate by grafting the brush having softness on the surface of the monodisperse polymer particle.

The polymer particle of the present invention is characteristically prepared by grafting the brush having softness onto the surface of the monodisperse polymer particle, particularly the monodisperse copolymer particle.

The monodisperse polymer of the present invention is the polymer prepared by the anion dispersion polymerization using a monomer, a stabilizer, a dispersion solvent and an anion polymerization initiator. The monodisperse copolymer is the copolymer prepared by anion dispersion polymerization using a monomer, a comonomer, a stabilizer, a dispersion solvent and an anion polymerization initiator.

The monomer herein can be any monomer that is appropriate for anion polymerization, and preferably the monomer or a monomer mixture composed of at least two different monomers selected from the group consisting of vinyl aromatic monomers having nonpolar substituents, conjugated diene monomers and acrylic acid ester monomers. Among them, styrene is more preferred. The monomer can be added by 50-100 weight % for the total monomer or comonomer weight to prepare the monodisperse polymer or copolymer.

The comonomer also can be selected from the above group. But, divinylbenzene is preferably used. The comonomer can be added by 0-50 weight % for the total monomer or comonomer weight to prepare the monodisperse polymer or copolymer.

The preferable content of the monomer and comonomer in the reaction mixture composed of a monomer, a comonomer, and a dispersion solvent is 5-50 weight % for 100 weight % of the reaction mixture and more preferable content is 10-20 weight %.

The stabilizer added for the preparation of the monodisperse polymer plays a role in stabilizing the polymer particle in the dispersion solvent, which can be a double or triple block copolymer composed of vinyl aromatic hydrocarbon blocks and conjugated diene blocks. The stabilizer can change the length of each block according to the total monomer content and is preferably the one that has weight average molecular weight of 5,000-1,000,000 and more preferably the one that has weight average molecular weight of 10,000-300,000. When the weight average molecular weight is in the range of 5,000-1,000,000, the stabilizer can be dispersed evenly in the reaction solvent, producing the stability of the resultant polymer particle. The weight ratio of vinyl aromatic hydrocarbon block to conjugated diene block of the block copolymer forming the stabilizer is preferably 1:9-9:1 and is more preferably 2:8-6:4. If the vinyl aromatic hydrocarbon block in the block copolymer is short, the interaction between the block and the formed polymer chain will be too weak to generate polymer particles. On the contrary, the block is too long, solubility in the reaction solvent will be reduced to bring poor dispersion. The content of the stabilizer in the total monomer content is 0.1-10 weight % and 0.5-5 weight % is more preferred.

The dispersion solvent is any solvent that is appropriate for anion polymerization in which the monomer or copolymer is soluble but the prepared copolymer is insoluble. Specifically, the dispersion solvent can be one or a mixture of at least two selected from the group consisting of $C_5$-$C_{20}$ hydrocarbon solvents, aromatic hydrocarbon solvents and ether solvents.

The anion polymerization initiator can be any organic lithium compound appropriate for anion polymerization, and n-butyllithium, s-butyllithium or t-butyllithium is preferred. The content of the anion polymerization initiator in the total monomer content is 0.0001-0.001 weight % and 0.0003-0.0007 weight % is more preferred.

The monodisperse copolymer can be prepared by anion dispersion polymerization using all the above components at 0-50° C. for 0.5-12 hours.

The prepared monodisperse copolymer is a random or a block copolymer which is at least 1 μm in mean diameter, preferably 1-15 μm in mean diameter, and has the size distribution less than 1.5.

The brush is grafted on the surface of the monodisperse polymer particle or monodisperse copolymer particle by the anion polymerization, which is composed of conjugated diene monomers.

The conjugated diene monomer can be one or a mixture of at least two of those selected from the group consisting of 1,3-butadiene, 2,3-dimethyl-1,3-butadiene, piperylene, 3-butyl-1,3-octadiene, isoprene and 2-phenyl-1,3-butadiene, and particularly 1,3-butadiene or isoprene are preferred.

The weight average molecular weight of the brush is preferably 5,000-100,000. If the weight average molecular weight is less than 5,000, physical properties of the product will not be improved to the wanted level. If the weight average molecular weight is more than 100,000, viscosity of the particle surface will be growing, resulting in the coagulation of particles.

The graft efficiency of the brush is preferably at least 40% and more preferably at least 60%. The graft density of the brush is preferably $0.5 \times 10^6$-$6.5 \times 10^6$ chains/μm$^2$. The method of the present invention is to prepare the polymer particle with optimum impact strength and improved elastic recovery rate by grafting a conjugated diene monomer onto the surface of a styrene copolymer particle via anion dispersion polymerization. So, the graft efficiency, graft density and molecular weight of the brush are important factors affecting not only impact strength and elastic recovery rate but also other physical properties of the polymer particle. But, when the graft efficiency of the brush is increased, the graft density is reduced and vise-versa. So, it is important to regulate the graft efficiency and density properly at the same time to guarantee the satisfactory levels of physical properties. The followings are embodiments realizing such regulation according to the method of the invention.

The present invention provides a method of preparing a polymer particle. According to the method of the invention, anions are first formed on the surface of the monodisperse polymer particle by using an anion polymerization initiator or anions are formed in the double bond formed on the surface of the monodisperse copolymer particle, and then the conjugated diene monomer is added thereto, followed by anion polymerization to graft the brush.

Particularly, the method of preparing a polymer particle of the invention comprises the following steps:

(a) loading a reaction solvent, monodisperse polymer particles or monodisperse copolymer particles and a chelating ligand in a reactor and regulating a reaction temperature to 50-80° C.;

(b) inducing reaction by adding an anion polymerization initiator;

(c) grafting a brush by anion polymerization after adding a conjugated diene based monomer; and (d) terminating the reaction by adding a polymerization terminator.

The step (a) is the process to make proper conditions for the initiation of the reaction on the surface of the monodisperse polymer or copolymer particles by loading a reaction solvent, monodisperse polymer particles or monodisperse copolymer particles and a chelating ligand in a reactor and regulating the reaction temperature.

The chelating ligand is a kind of polar additive which is exemplified by tetra methylethylenediamine (TMEDA), tetrahydrofurane (THF), diglyme, dioxane and tetramethyl ethylenediphosphine. The chelating ligand plays a role in helping an anion polymerization initiator such as butyllithium form anions on the surface of the polystyrene or styrene-divinylbenzene copolymer particle.

The reaction temperature of step (a) is preferably 50-80° C.

In step (b), an anion polymerization initiator is added to the reaction mixture of step (a) by 0.1-5 weight % for the content of the monodisperse polymer particle, followed by reaction for 1-5 hours to form anions on the surface of the monodisperse polymer particle.

The anion polymerization initiator is exemplified by n-butyllithium, s-butyllithium or t-butyllithium.

The molar ratio of the chelating ligand to the anion polymerization initiator is preferably 0.05-1:1. The weight ratio of the anion polymerization initiator to the monodisperse polymer and the molar ratio of the chelating ligand to the anion polymerization initiator are important factors affecting the amount of anion formed on the surface of the monodisperse polymer particle, the amount of free-anion polymerization initiator (indicating the amount of anion polymerization initiator that remains without being used for forming anions on the surface of the monodisperse polymer particle), the graft polymerization of the conjugated diene monomer on the surface of the monodisperse polymer particle, the initiation of the polymerization of the conjugated diene monomer by the free anion polymerization initiator and the chain extension. Therefore, it is important to regulate these factors in the mentioned range in order to obtain the product with satisfactory physical properties.

When the anion polymerization initiator is combined with the chelating ligand, anions are generated by using protons in the position of benzyl or in the benzene ring on the surface of the polystyrene particle.

In the meantime, when a copolymer is prepared by the copolymerization of styrene and divinylbenzene, there might be vinyl functional groups remaining non-reacted on the surface of the copolymer particle owing to the different reactivity of the two vinyl functional groups in the divinylbenzene. The vinyl functional group can be effectively used for grafting by anion dispersion polymerization. Thus, in the present invention, the monodisperse polymer prepared from a single monomer can be used but preferably the comonomer comprising the monomer and at least two different vinyl functional groups, for example the monodisperse copolymer generated from the copolymerization of styrene and divinylbenzene, can be used.

The step (b) can additionally include the step of eliminating the non-reacted anion polymerization initiator remaining in the reactor by repeated washing after forming anions on the surface of the monodisperse polymer particle.

The elimination of the non-reacted anion polymerization initiator results in the increase of graft density and efficiency and also be an important tool to provide effective condition for grafting on the surface of the monodisperse polymer particle.

In step (c), 5-50 weight % of the conjugated diene monomer is added to the monodisperse polymer having anions formed on the particle surface, followed by anion polymerization to lead graft polymerization of the brush.

At this time, the graft efficiency of the conjugated diene monomer on the surface of the monodisperse polymer particle is calculated by the following mathematical formula 1 and the graft density ($\sigma$, the number of brush grafted on the unit area on the monodisperse polymer particle) is calculated by the following mathematical formula 2.

Graft efficiency(%)=total weight(weight %)of the brush grafted/input amount of the conjugated diene monomer(weight %)×100  [Mathematical Formula 1]

Graft density(chains/$\mu m^2$)=$g_d \times D \times \rho_p \times N_A/6M_g$  [Mathematical Formula 2]

$g_d$: weight of the brush grafted (g)/weight of the monodisperse copolymer particle (g)

D: diameter of the monodisperse copolymer particle ($\mu m$)

$\rho_p$: density of the monodisperse copolymer particle (g/$\mu m^3$)

$N_A$: Avogadro's number $M_g$: weight of the brush grafted (g)

The anion polymerization is performed at 40-80° C. for 1-10 hours.

In step (d), a polymerization terminator is added to terminate the reaction of step (c).

The polymerization terminator herein can be carbon dioxide, water, alcohol or a hydrogen ion containing reagent and the preferable content of the polymerization terminator is 0.1-2 weight % for the content of the monodisperse copolymer particle.

The polymer particle prepared by the method of the invention has excellent impact strength and elastic recovery rate owing to the grafting of the brush comprising the conjugated diene monomer on the surface of the monodisperse polymer or copolymer particle.

BRIEF DESCRIPTION OF THE DRAWINGS

The application of the preferred embodiments of the present invention is best understood with reference to the accompanying drawings, wherein:

FIG. 1 is a SEM photograph of the polymer particle having the brush prepared in Example 9

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

Preparation by Regulating Content of Anion Polymerization Initiator Content

EXAMPLE 1

10 $\mu l$ of n-hexane was added in a reactor, to which 0.5 g of poly(styrene-co-divinylbenzene)copolymer of 5 $\mu l$ in mean diameter was added as a monodisperse copolymer. After adding TMEDA (tetramethyl ethylenediamine), the polar additive (chelating ligand), the temperature of the reactor was raised to 60° C. The anion polymerization initiator n-butyllithium was added thereto by $2 \times 10^{-4}$ mol for 1 g of the monodisperse copolymer, followed by stirring for 2 hours to induce the reaction of n-butyllithium with the double bond on the surface of the poly(styrene-co-divinylbenzene)copolymer particle. 1 g of the conjugated diene monomer isoprene was added thereto, followed by reacting for 5 hours to prepare a polymer brush. 2-propanol was added to terminate the reaction and then 1 weight % of an antioxidant was added and dispersed evenly, followed by filtering.

The yield and the graft efficiency of the polymer brush were measured and shown in Table 1.

EXAMPLES 2-5

Experiments were performed by the same manner as described in Example 1 except that the content of the anion polymerization initiator was added as shown in Table 1.

EXAMPLES 6-8

Experiments were performed by the same manner as described in Example 1 except that the content of the anion polymerization initiator was added according to Table 1 to react n-butyllithium with the double bond on the surface of the poly(styrene-divinylbenzene)copolymer particle and the non-reacted anion polymerization initiator remaining in the reactor was eliminated by repeated washing.

TABLE 1

|  |  | [Li]/ copolymer 1 g ($\times 10^{-4}$ mol) | [TMEDA]/ [Li] | Yield (%) | Graft efficiency (%) | Weight average molecular weight of the brush grafted ($10^3$ g/mol) |
|---|---|---|---|---|---|---|
| Example | 1 | 2 | 1 | 99 | 16 | 6.6 |
|  | 2 | 1.2 | 1 | 90 | 22 | 7.9 |
|  | 3 | 0.66 | 1 | 88 | 32 | 12.8 |
|  | 4 | 0.48 | 1 | 61 | 45 | 34.7 |
|  | 5 | 0.3 | 1 | 45 | 49 | 22.4 |
|  | 6 | 1 | 1 | 98 | 58 | 121.9 |
|  | 7 | 0.8 | 1 | 96 | 72 | 69.1 |
|  | 8 | 0.7 | 1 | 91 | 83 | 103.6 |

In Table 1, the yield indicates the polymerization conversion rate of isoprene.

As shown in Table 1, the graft efficiency was increased with the decrease of the polymerization initiator content in Examples 1-5. As the graft efficiency goes high, the chances of producing a polymer brush having high weight average molecular weight are high.

In Examples 6-8, n-butyllithium was reacted with the double bond on the surface of the poly(styrene-divinylbenzene)copolymer particle, followed by washing over several times to eliminate the non-reacted polymerization initiator. Herein, the polymerization initiator content was reduced but yield was as high as at least 90% and the molecular weight of the brush was also high, and as a result the graft efficiency was improved up to 83%.

Preparation by Regulating Content of Polar Additive

EXAMPLES 9-11

Experiments were performed by the same manner as described in Example 7 except that the content of the polar additive was regulated as shown in Table 2.

TABLE 2

|  |  | [TMEDA]/ [Li] | Yield (%) | Graft efficiency (%) | Graft density ($\times 10^{-6}$ chains/$\mu m^2$) |
|---|---|---|---|---|---|
| Example | 9 | 0.1 | 94 | 87 | 5.511 |
|  | 10 | 0.5 | 98 | 70 | 3.636 |
|  | 11 | 1 | 96 | 72 | 1.623 |

As shown in Table 2, the polar additive content was regulated in Examples 9-10. With the increase of the polar additive content, the graft efficiency and density was reduced. When the ratio of the content of the polar additive to the anion polymerization initiator was 0.1:1, the highest graft density was observed.

Preparation by Regulating Content of Conjugated Diene Monomer

EXAMPLES 12-14

Experiments were performed by the same manner as described in Example 7 except that the content of isoprene, the conjugated diene monomer, was regulated as shown in Table 3.

TABLE 3

|  |  | Isoprene [TMEDA]/ [Li] | (weight part) | Yield (%) | Graft efficiency (%) | Weight average molecular weight of the brush grafted |
|---|---|---|---|---|---|---|
| Example | 12 | 0.1 | 1.1 | 100 | 52 | 54.8 |
|  | 13 | 0.1 | 0.75 | 98 | 44 | 52.1 |
|  | 14 | 0.1 | 0.38 | 97 | 58 | 37.3 |

As shown in Table 3, the content of isoprene was regulated in Example 12-14. With the increase of the content of isoprene, the weight average molecular weight of the brush was increased.

COMPARATIVE EXAMPLE 1

An experiment was performed by the same manner as described in Example 1 except that the brush was not prepared.

EXPERIMENTAL EXAMPLE

The polymer brushes prepared in Examples 1-8 and Comparative Example 1 were tested for impact strength and elastic recovery rate as follows and the results are shown in Table 4. FIG. 1 is the SEM photograph illustrating the polymer brush of Example 9.

*Impact strength and elastic recovery rate—measured by MCT (Shimadzu, JAPAN). Maximum force for measuring impact strength was 10 gf. And maximum force and minimum force for measuring elastic recovery rate were 1 gf and 0.1 gf.

TABLE 4

|  |  | Weight average molecular weight of the brush grafted ($10^{-3}$ g/mol) | Impact strength (kg/mm$^2$) | Elastic recovery rate (%) |
|---|---|---|---|---|
| Example | 1 | 6.6 | 290 | 8 |
|  | 2 | 7.9 | 295 | 9 |
|  | 3 | 12.8 | 300 | 9 |
|  | 4 | 34.7 | 377 | 13 |
|  | 5 | 22.4 | 310 | 10 |
|  | 6 | 121.9 | 390 | 18 |
|  | 7 | 69.1 | 361 | 15 |
|  | 8 | 103.6 | 380 | 16 |
| Comparative Example | 1 | — | 288 | 8 |

As shown in Table 4, the polymer particles of Examples 1-8, which contain the brush comprising isoprene grafted on the surface of the monodisperse poly(styrene-divinylbenzene)copolymer particle, had excellent impact strength and elastic recovery rate, comparing with the polymer particles which did not contain the brush (Comparative Example 1).

FIG. 1 is a SEM photograph illustrating the polymer particle of Example 9. As shown in this FIGURE, the brush was grafted on the surface of the monodisperse copolymer particle.

Industrial Applicability

The present invention provides a polymer particle having optimum impact strength and improved elastic recovery rate by grafting the brush having softness onto the surface of the monodisperse polymer particle, in particular the polymer particle having preferable physical properties for the use as a polymer core particle of a conductive ball of conductive adhesive.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A polymer particle containing:
   (i) a monodisperse polymer particle; and
   (ii) a brush;
   wherein the polymer particle is prepared by:
   (a) reacting the surface of the monodisperse polymer particle with an anion polymerization initiator;
   (b) eliminating non-reacted anion polymerization initiator; and
   (c) grafting the brush onto the surface of the monodisperse polymer particle by anionic graft polymerization of a conjugated diene monomer,
   wherein the polymer particle has an impact strength ranging from about 361 kg/mm$^2$ to about 390 kg/mm$^2$ and an elastic recovery rate ranging from about 15% to about 18%.

2. The polymer particle according to claim 1, wherein the monodisperse polymer particle is prepared by the anion dispersion polymerization of one or more monomers, a dispersion solvent, and an anion polymerization initiator.

3. The polymer particle according to claim 2, wherein the monodisperse polymer particle is 1-15 μm in mean diameter and has the size distribution less than 1.5.

4. The polymer particle according to claim 3, wherein the monodisperse polymer particle is prepared by the polymerization of 50-100 weight % of a styrene monomer and 0-50 weight % of a comonomer.

5. The polymer particle according to claim 4, wherein the comonomer is divinylbenzene.

6. The polymer particle according to claim 4, wherein the conjugated diene monomer is one or more compounds selected from the group consisting of 1,3-butadiene, 2,3-dimethyl-1,3-butadiene, piperylene, 3-butyl-1,3-octadiene, isoprene and 2-phenyl-1,3-butadiene.

7. The polymer particle according to claim 4, wherein the weight average molecular weight ($M_w$) of the brush ranges from about 69,100 to about 121,900.

8. The polymer particle according to claim 7, wherein the graft efficiency of the brush is at least 40%.

9. The polymer particle according to claim 7, wherein the graft efficiency of the brush is at least 60%.

10. The polymer particle according to claim 9, wherein the graft density of the brush is $0.5 \times 10^6$ -$6.5 \times 10^6$ chains/μm$^2$, and the graft density is represented by a mathematical formula:

$$\text{graft density} = g_d \times D \times \rho_p \times N_A / 6 M_g$$

wherein $g_d$ is a ratio of the weight of the brush (g) to the weight of the monodisperse polymer particle (g), D is the diameter of the monodisperse polymer particle (μm), $\rho_p$ is the density of the monodisperse polymer particle (g/μm$^3$), $N_A$ is Avogadro's number, and $M_g$ is the weight of the brush (g).

* * * * *

UNITED STATES PATENT AND TRADEMARK OFFICE
CERTIFICATE OF CORRECTION

| | |
|---|---|
| PATENT NO. | : 8,415,436 B2 |
| APPLICATION NO. | : 12/516006 |
| DATED | : April 9, 2013 |
| INVENTOR(S) | : Bo-ryeong Han et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this
Nineteenth Day of July, 2016

Michelle K. Lee
*Director of the United States Patent and Trademark Office*